United States Patent
Nagashima (10) Patent No.: US 10,096,090 B2
(45) Date of Patent: Oct. 9, 2018

(54) IMAGE PROCESSING APPARATUS, IMAGE PROCESSING METHOD, AND STORAGE MEDIUM, RELATING TO EMPHASIZING A CONTOUR REGION

(71) Applicant: CANON KABUSHIKI KAISHA, Tokyo (JP)

(72) Inventor: Yoshiyuki Nagashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 15/168,733

(22) Filed: May 31, 2016

(65) Prior Publication Data

US 2016/0358317 A1     Dec. 8, 2016

(30) Foreign Application Priority Data

Jun. 4, 2015   (JP) .................. 2015-113959

(51) Int. Cl.
  *G06T 5/10*  (2006.01)
  *G06T 5/00*  (2006.01)
  *G06T 7/13*  (2017.01)

(52) U.S. Cl.
  CPC ............ *G06T 5/003* (2013.01); *G06T 7/13* (2017.01); *G06T 2207/20192* (2013.01)

(58) Field of Classification Search
  CPC .......... G06T 2207/20192; G06T 5/003; H04N 1/4092
  See application file for complete search history.

(56) References Cited

U.S. PATENT DOCUMENTS

2014/0226856 A1*  8/2014  Xie ............... G06K 9/00624
                                                                 382/103
2016/0171338 A1*  6/2016  Mine .............. H04N 5/142
                                                                 382/199

FOREIGN PATENT DOCUMENTS

JP           2001008065 A      1/2001

* cited by examiner

*Primary Examiner* — Brian Werner
(74) *Attorney, Agent, or Firm* — Canon U.S.A., Inc. IP Division (57) ABSTRACT

An image processing apparatus includes an identification unit configured to identify a contour region including a contour component in an input image, a determination unit configured to determine a scatter degree of the contour region in the input image, an emphasis processing unit configured to increase, in a case where the scatter degree of the contour region is greater than a determination value, an emphasis degree of the contour region in comparison to a case where the scatter degree is equal to or less than the determination value, and an output unit configured to output, to a display unit, the input image including the contour region in which the emphasis processing unit increases the emphasis degree.

17 Claims, 8 Drawing Sheets

IMAGE PROCESSING APPARATUS, IMAGE PROCESSING METHOD, AND STORAGE MEDIUM, RELATING TO EMPHASIZING A CONTOUR REGION

BACKGROUND OF THE INVENTION

Field of the Invention

The present invention relates to an image processing apparatus, an image processing method, and a storage medium.

Description of the Related Art

Conventionally, there has been known a technique for displaying an in-focus region in an image in a mode different from modes of the other regions. Japanese Patent Application Laid-Open No. 2001-008065 discusses a technique for executing processing for coloring a contour portion according to the degree of clearness of the contour portion of an image and outputting the image in which an in-focus region is recognizable.

SUMMARY OF THE INVENTION

According to an aspect of the present invention, an image processing apparatus includes an identification unit configured to identify a contour region including a contour component in an image, a determination unit configured to determine a scatter degree of the contour region in the image, an emphasis processing unit configured to increase, in a case where the scatter degree of the contour region is greater than a first predetermined value, an emphasis degree of the contour region in comparison to a case where the scatter degree is equal to or less than the first predetermined value, and an output unit configured to output, to a display unit, the image including the contour region in which the emphasis processing unit increases the emphasis degree.

Further features of the present invention will become apparent from the following description of exemplary embodiments with reference to the attached drawings.

DESCRIPTION OF THE EMBODIMENTS

Configuration of Image Display System S

Figure 1:
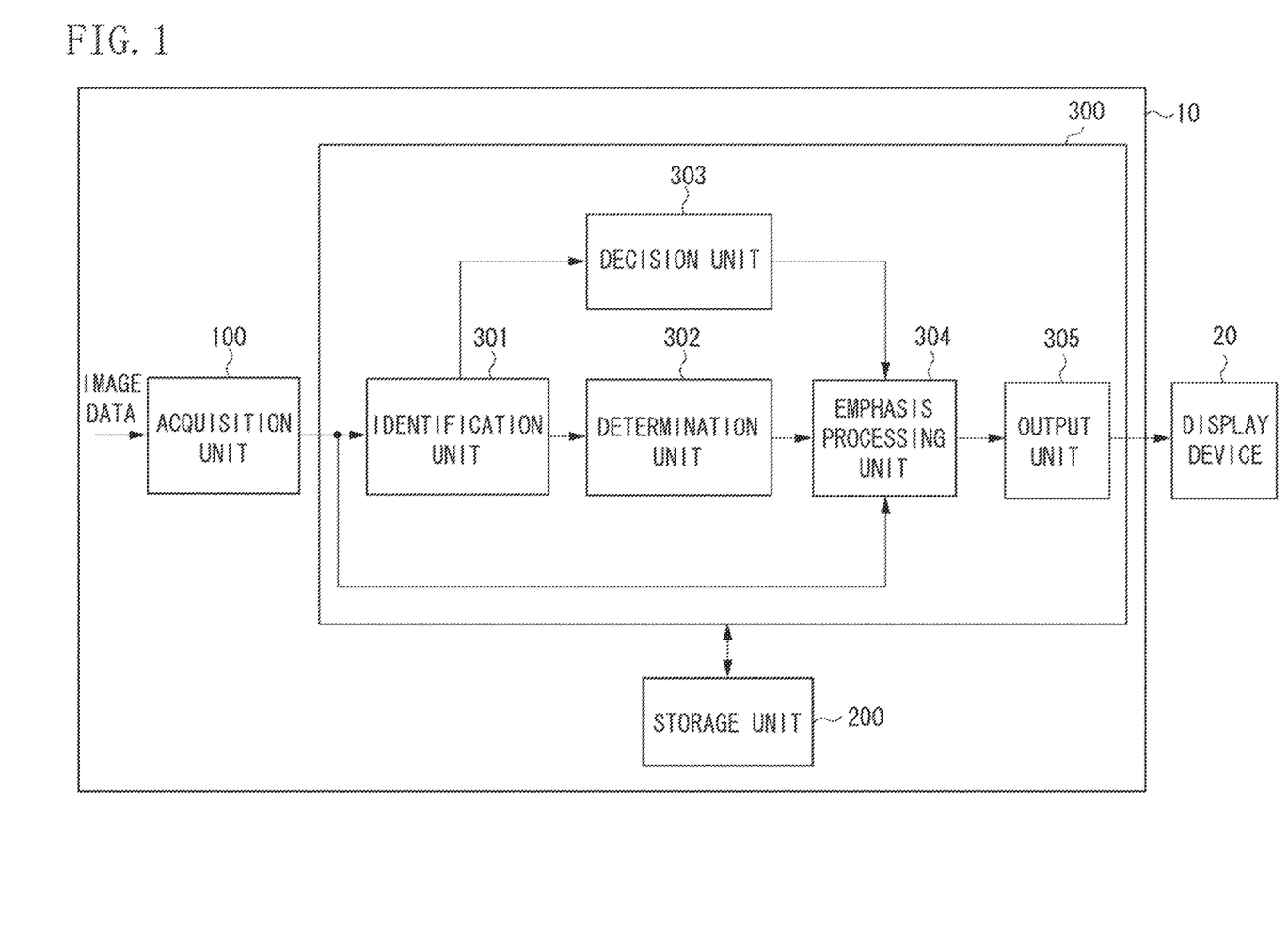
FIG. 1 is a block diagram illustrating a configuration of an image display system according to a first exemplary embodiment.

A first exemplary embodiment will be described below. FIG. 1 is a block diagram illustrating a configuration of an image display system S. The image display system S according to the present exemplary embodiment will be described below. The image display system S is a system for displaying an image in which a predetermined region in the image is emphasized.

The image display system S includes an image processing apparatus 10 and a display device 20. For example, the image processing apparatus 10 and the display device 20 are connected to each other via a cable conforming to the DisplayPort standards.

For example, the image processing apparatus 10 may be computer that outputs an image in which a predetermined region in the image is emphasized to the display device 20. For example, the display device 20 may be a display having a liquid crystal panel or an organic electro luminescence (EL) panel, which displays an image based on image data received from the image processing apparatus 10. In addition, the term "image" used in the present specification includes a static image and a moving image (video image).

Hereinafter, a configuration and an operation of the image processing apparatus 10 will be described in detail with reference to FIG. 1.

The image processing apparatus 10 includes an acquisition unit 100, a storage unit 200, and a control unit 300.

The acquisition unit 100 serves as an interface for acquiring image data of an image (hereinafter, referred to as "input image") received from an external device (not illustrated) such as an imaging device. For example, the acquisition unit 100 may be a universal serial bus (USB) interface or a local area network (LAN) interface.

The storage unit 200 is a storage medium such as a read only memory (ROM), a random access memory (RAM), or a hard disk. The storage unit 200 stores image data of the input image, a program executed by the control unit 300, and various kinds of data generated by the control unit 300.

The control unit 300 is a central processing unit (CPU) for example, and functions as an identification unit 301, a determination unit 302, a specifying unit 303, an emphasis processing unit 304, and an output unit 305 by executing a program stored in the storage unit 200. Hereinafter, various functional units provided by the control unit 300 will be described.

The identification unit 301 identifies a contour region including a contour component in the input image based on the image data acquired by the acquisition unit 100. Specifically, the identification unit 301 analyzes a frequency component in the image data to detect a contour component including a high-frequency component equal to or greater than a predetermined threshold value, and identifies a region including the contour component as a contour region. For example, the identification unit 301 divides the image into a plurality of regions, inputs the image data to a band-pass filter at each divided region, and identifies the contour region based on the image data that has passed the band-pass filter. From the pixels included in the image data, the identification unit 301 may identify, as contour components, pixels in which density or color thereof is considerably changed by a predetermined value in comparison to that of adjacent pixels, and may identify, as a contour region, a region in which the identified pixels continuously exist at an interval equal to or less than a predetermined distance. As described above, the identification unit 301 can identify a contour line included in an in-focus region.

Figure 2:
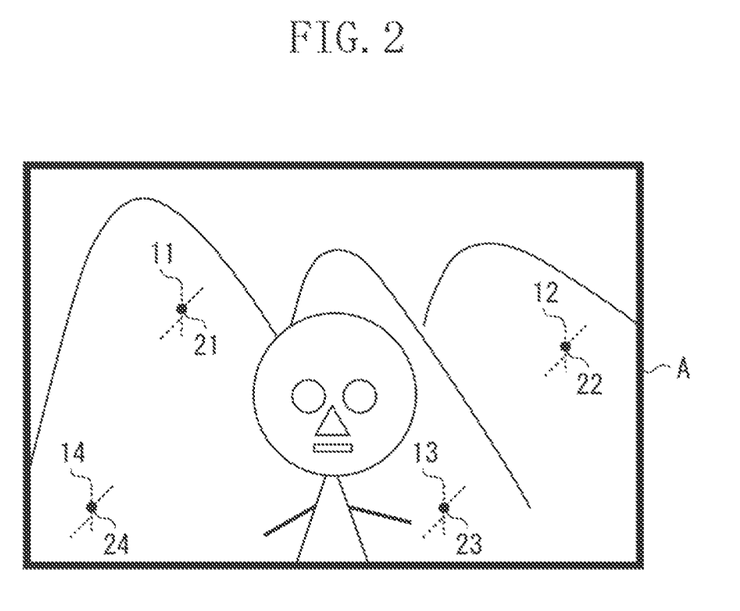
FIG. 2 is a diagram illustrating an example of a contour region in an input image.

FIG. 2 is a diagram illustrating an example of the contour region in the input image. In the example illustrated in FIG. 2, contour regions 11 to 14 in an input image A identified by the identification unit 301 are respectively indicated by dotted lines. The identification unit 301 selects one pixel from among the pixels included in each of the contour regions 11 to 14 to identify a position of the selected pixel as a contour position corresponding to each of the contour regions 11 to 14. For example, the identification unit. 301 selects a position of a center of gravity at each of the contour regions 11 to 14. In the example illustrated in FIG. 2, contour positions 21 to 24 respectively corresponding to the contour regions 11 to 14 in the input image A are illustrated. The identification unit 301 notifies the determination unit 302 of contour position information indicating coordinate information of the contour positions 21 to 24 in the input image A. Further, the identification unit 301 notifies the specifying unit 303 of contour region information indicating a position of each of the pixels included in the contour regions 11 to 14.

The determination unit 302 determines a degree to which the contour regions are scattered in the input image (hereinafter, referred to as "scatter degree"). For example, the determination unit 302 calculates an average value of distances between a plurality of contour positions based on the contour position information notified from the identification unit 301. Then, the determination unit 302 determines the calculated average value as the scatter degree. Specifically, the determination unit 302 determines whether the average value of distances between the contour positions exceeds a previously set determination value L (i.e., first predetermined value). For example, when the average value of the distances between the contour positions 21, 22, 23, and 24 exceeds the determination value L in the example illustrated in FIG. 2, the determination unit 302 determines that the scatter degree of the contour region is high.

In addition, a method in which the determination unit 302 determines the scatter degree of the contour region is not limited to the above. The determination unit 302 may calculates a polygonal area having the contour positions 21, 22, 23, and 24 as vertexes thereof to determine the scatter degree based on the calculated area. For example, when a value of a ratio of the number of pixels included in the polygonal figure to the number of pixels of the input image exceeds a previously set determination value N, the determination unit 302 determines that the scatter degree of the contour region is high. On the other hand, when the value of the ratio thereof is equal to or less than the determination value N, the determination unit 302 determines that the scatter degree of the contour region is low.

Subsequently, the determination unit 302 notifies the emphasis processing unit 304 of the determination result of the scatter degree. For example, as a determination result, the determination unit 302 notifies the emphasis processing unit 304 of information indicating that the scatter degree is greater than the determination value L, or information indicating that the scatter degree is equal to or less than the determination value L. Alternatively, the determination unit 302 may notify the emphasis processing unit 304 of a numerical value indicating the scatter degree as a determination result.

The specifying unit 303 specifies the number of pixels included in the contour region by calculating a total number of pixels included in the contour region indicated by the contour region information notified from the identification unit 301. The number of pixels included in the contour region is used for identifying a size of the contour region and a ratio of the contour region with respect to the entire input image. The specifying unit 303 notifies the emphasis processing unit 304 of the total number of pixels included in the contour region.

The emphasis processing unit 304 executes processing for emphasizing the contour region. For example, the emphasis processing unit 304 emphasizes the contour region by darkening the color of the contour line or thickening the contour line. The emphasis processing unit 304 darkens the color of the contour line by changing a pixel value of the pixel in the contour region from a pixel value of the input image. The emphasis processing unit 304 thickens the contour line by changing the number of pixels the pixel values of which are to be changed.

Based on the determination result notified from the determination unit 302, the emphasis processing unit 304 sets a degree to which the contour region is emphasized (hereinafter, referred to as "emphasis degree"). For example, the emphasis degree may be a degree to which a pixel value of the pixel in the contour region or a pixel value of the pixel in a vicinity of the contour region is changed, or may be a degree to which the number of pixels the pixel values of which are to be changed is changed. In a case where the scatter degree of the contour region is greater than the previously set determination value L, the emphasis processing unit 304 increases the emphasis degree of the contour region in comparison to a case where the scatter degree thereof is equal to or less than the determination value L. For example, the emphasis processing unit 304 increases the emphasis degree of the contour region by changing a thickness of the contour line corresponding to the contour component in order to emphasize the contour line.

The emphasis processing unit 304 executes the emphasis processing on the contour region by using the set emphasis degree and generates a combined image in which the contour region in the input image is emphasized. Specifically, based on the emphasis degree, the emphasis processing unit 304 generates the combined image by changing a pixel value of the pixel in the contour region in the input image A or a pixel value of the pixel in a vicinity of the contour region. More specifically, the emphasis processing unit 304 generates a processing image by extracting a pixel in the contour region or a pixel in a vicinity of the contour region, and generates the combined image by combining an image after changing the pixel value of the processing image with the input image.

Figure 3A:
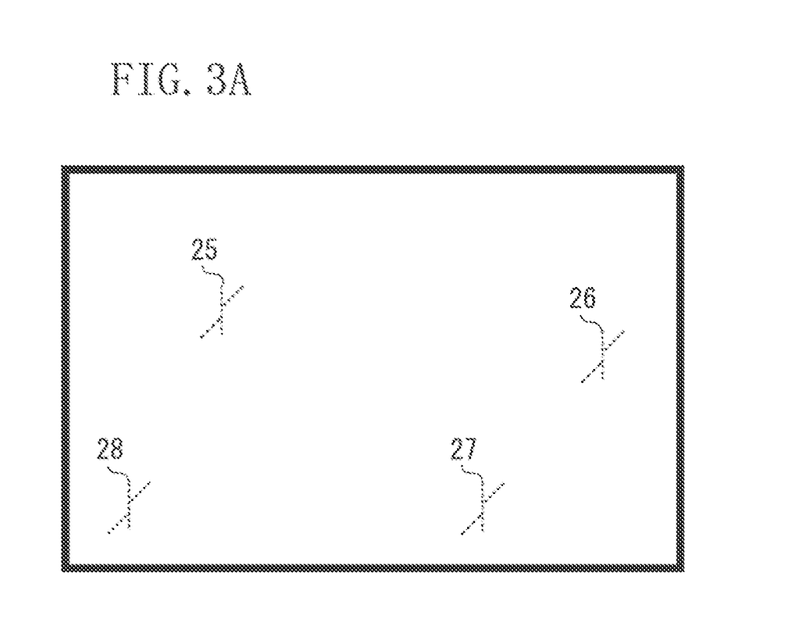
FIG. 3A is a diagram illustrating an example of a processing image including a contour region.

FIG. 3A is a diagram illustrating an example of the processing image including the contour region in the example illustrated in FIG. 3A, contour regions 25 to 28 allocated in the processing image, which respectively correspond to the contour regions 11 to 14 of the input image A illustrated in FIG. 2, are indicated by dotted lines. The emphasis processing unit 304 executes the emphasis processing on the contour regions 25 to 28 in the processing image by using the previously set emphasis degree.

Figure 3B:
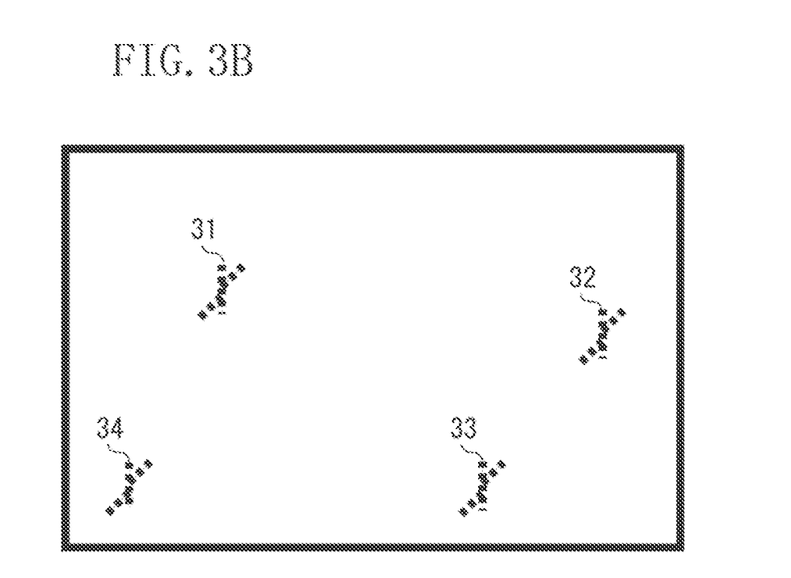
FIG. 3B is a diagram illustrating an example of a processing image including a contour region on which emphasis processing is executed.

FIG. 3B is a diagram illustrating an example of the processing image including the contour regions on which the emphasis processing is executed. In the example illustrated in FIG. 3B, the contour regions 25 to 28 in the example of FIG. 3A are thickened and emphasized by the emphasis processing unit 304 through the emphasis processing, which are respectively illustrated as contour regions 31 to 34. The emphasis processing unit 304 combines the processing image on which the emphasis processing of the contour region is executed and the input image to generate a combined image. For example, the emphasis processing unit 304 executes combining processing for superimposing the contour regions 31 to 34 thickened and emphasized in the processing image illustrated in FIG. 3B onto the input image A to generate the combined image.

Figure 4:
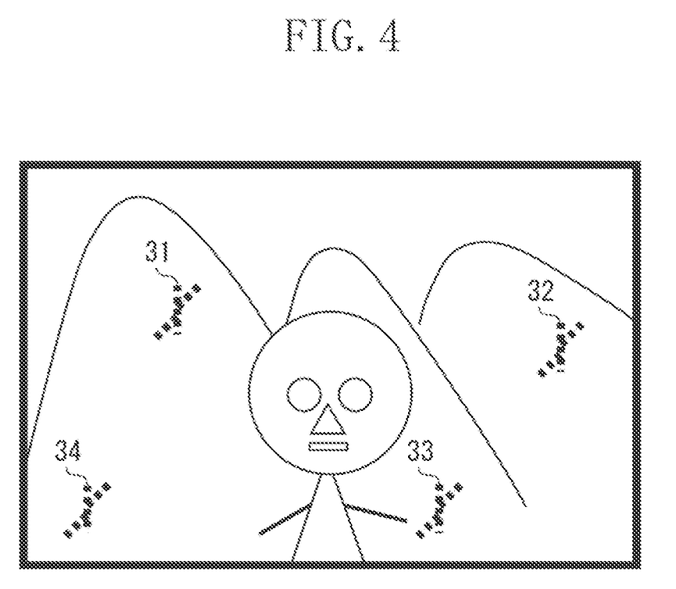
FIG. 4 is a diagram illustrating an example of a combined image in which emphasis processing is executed on a contour region.

FIG. 4 is a diagram illustrating an example of the combined image in which the emphasis processing is executed on the contour regions. In the example of FIG. 4, the contour regions 31 to 34 that are emphasized to be thicker than the contour regions 11 to 14 are illustrated instead of the contour regions 11 to 14 in FIG. 2, and thus the visibility of the contour regions 31 to 34 is improved in comparison to that of the contour regions 11 to 14.

When the scatter degree is greater than the determination value L, the emphasis processing unit 304 may set a magnitude of the emphasis degree of the contour region according to a magnitude of the scatter degree. For example, when a value of the scatter degree notified from the determination unit 302 is greater than the determination value L, the emphasis processing unit 304 sets the magnitude of the emphasis degree in proportion to the magnitude of the value of scatter degree. For example, in a case where the thickness of the contour dine is set as the emphasis degree of the contour region, the emphasis processing unit 304 sets the emphasis degree to emphasize the contour region to be thicker when the scatter degree of the contour region is greater.

Further, the emphasis processing unit 304 may set the emphasis degree of the contour region based on the number of pixels the contour region input by the specifying unit 303 and the scatter degree of the contour region determined by the determination unit 302. For example, the emphasis processing unit 304 may increase the emphasis degree of the contour region when the number of pixels specified by the specifying unit 303 is equal to or less than a previously set reference number X (i.e., first predetermined number), and the scatter degree of the contour region determined by the determination unit 302 is greater than the determination value L.

With this configuration, with respect to the contour regions that are small and scattered in the input image, the emphasis processing unit 304 can increase the degree of emphasis processing. Therefore, the emphasis processing unit 304 can effectively emphasize the contour regions that are less visible as they are small and scattered in the input image. Further, the emphasis processing unit 304 may reduce the emphasis degree of the contour region if the number of pixels included in the contour region calculated by the specifying unit 303 is greater than the previously set reference number X, and the scatter degree of the contour region is equal to or less than the determination value L.

Figure 5A:
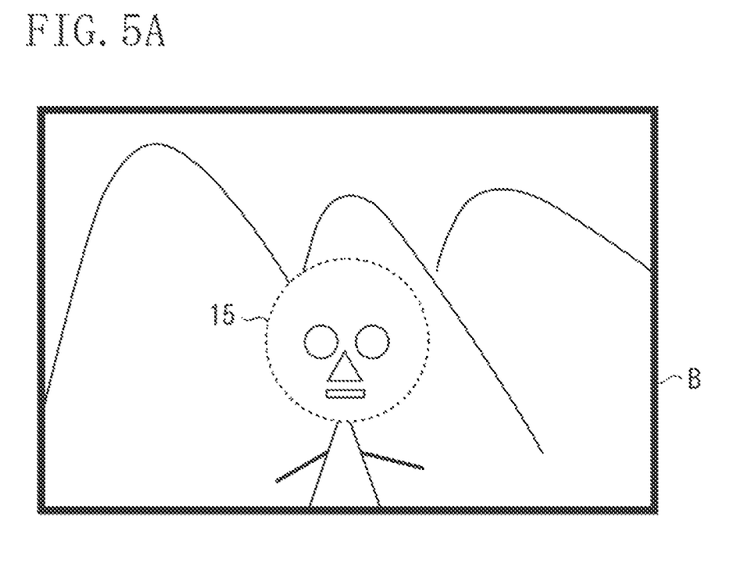
FIG. 5A is a diagram illustrating another example of emphasis processing with respect to a contour region.

FIG. 5A is a diagram illustrating another example of the contour region in the input image. In the example illustrated in FIG. 5A, a contour region 15 as a contour of a head of a person as an object in an input image B is indicated by a dotted line. For example, when the number of pixels included in the contour region 15 illustrated in FIG. 5A is greater than the reference number X, and the scatter degree thereof is equal to or less than the determination value L, the emphasis processing unit 304 makes the emphasis degree of the contour region 15 be smaller than the emphasis degree that is to be set thereto when the scatter degree is greater than the determination value L.

Figure 5B:
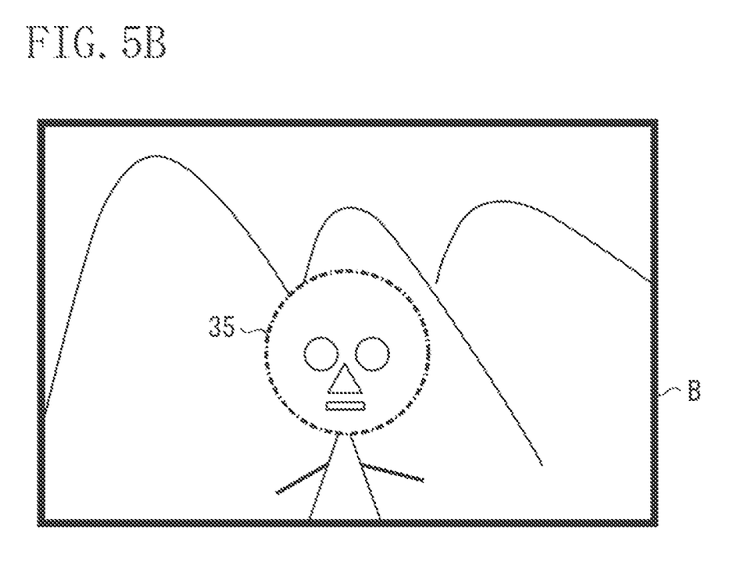
FIG. 5B is a diagram illustrating another example of combined image in which emphasis processing is executed on a contour region.

FIG. 5B is a diagram illustrating another example of the combined image in which the emphasis processing is executed on the contour region. In the example in FIG. 5B, the contour region 15 of FIG. 5A is emphasized and illustrated as a contour region. 35 that is indicated by a dashed-dotted line. The contour region 35 is a region on which the emphasis processing is executed at the emphasis degree of a small value. Therefore, the emphasis degree of the contour region 35 is suppressed in comparison to that of the contour regions 31 to 34 illustrated in FIG. 4, on which the emphasis processing is executed at the emphasis degree of a large value.

Further, in the above-described example, although the emphasis processing unit 304 sets one emphasis degree with respect to each input image, the configuration is not limited thereto. For example, the identification unit 301 may divide the input image into a plurality of divided regions and identify the contour region in each of the divided regions, so that the emphasis processing unit 304 may increase the emphasis degree of the contour region included in the divided region in which the scatter degree is greater than the determination value L from among the plurality of divided regions.

Figure 6A:
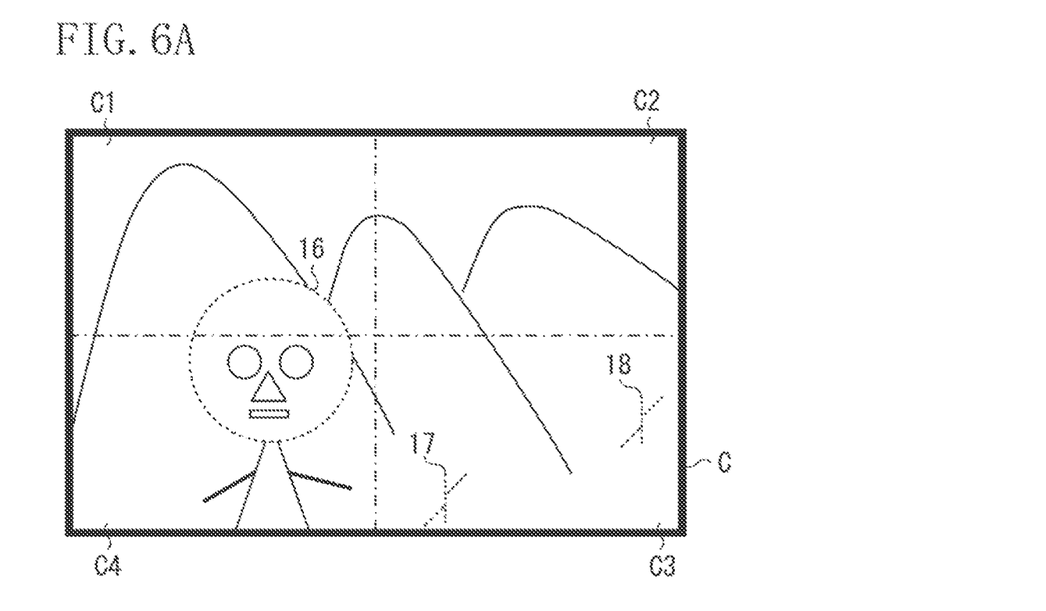
FIG. 6A is a diagram illustrating examples of contour regions included in a plurality of divided regions.

FIG. 6A is a diagram illustrating the contour regions included in a plurality of divided regions. In the example in FIG. 6A, a contour region 16 as a contour of the head of a person as an object and two contour regions 17 and 18 in a background as an object are indicated by dotted lines in an input image C. For example, when the emphasis processing is executed on the contour regions in the input image C, first, the identification, unit 301 divides the input image C into a plurality of divided regions C1 to C4 and identifies a contour region in each of the divided regions C1 to C4. Further, the determination unit 302 determines the scatter degree of the contour region in each of the divided regions C1 to C4.

Next, the emphasis processing unit 304 determines the emphasis degree based on the size of the contour region and the determination result of the scatter degree in each the divided regions C1 to C4. In the example illustrated in FIG. 6A, because the number of pixels in each of the contour regions 17 and 18 included in the divided region C3 is equal to or less than the reference number X, and the scatter degree is greater than the previously set determination value L, the emphasis processing unit 304 increases the emphasis degree with respect to the contour regions 17 and 18 included in the divided region C3. Further, because the number of pixels in the contour region 16 included in the divided regions C1 and C4 is greater than the reference number X, and the scatter degree is equal to or less than the determination value L, the emphasis processing unit 304 does not increase the emphasis degree with respect to the contour region 16 included in the divided regions C1 and C4.

Figure 6B:
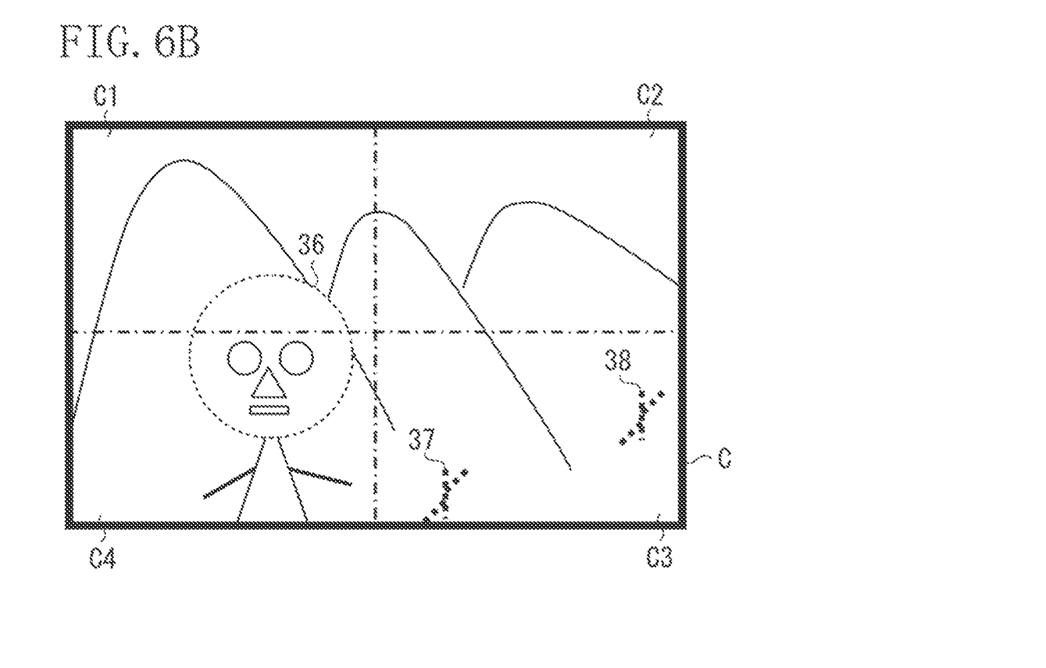
FIG. 6B is a diagram illustrating an example of a combined image in which emphasis processing is executed on contour regions included in a plurality of divided regions.

FIG. 6B is a diagram illustrating an example of a combined image in which the emphasis processing is executed on the contour regions included in the divided region C3. In the example illustrated in FIG. 6B, contour regions 37 and 38 included in the divided region C3 are emphasized to be thicker than a contour region 36. With this configuration, even if a region in which the contour components are concentrated and a region in which the contour components are scattered are intermingled in the input image, the emphasis processing at greater emphasis degree can be executed on the region in which the contour components are scattered.

Further, in the above-described example, the emphasis processing unit 304 increases only the emphasis degree with respect to the contour regions 17 and 18 included in the divided region C3. However, the configuration is not limited thereto. For example, the emphasis processing unit 304 may execute the emphasis processing on the contour region included in each of the divided regions using the emphasis degree that is gradually set to each of the divided regions.

Referring back to FIG. 1, the output unit 305 outputs the image data of the combined image generated by the emphasis processing unit 304 to the display device 20. With this processing, a user of the image display system S can confirm the combined image displayed on the display device 20 in which the contour region is emphasized to become visible favorably.

Further, in the above-described example, the emphasis processing unit 304 executes the emphasis processing for thickening the contour region according to the scatter degree. However, the configuration is not limited thereto. For example, the emphasis processing unit 304 may execute the emphasis processing by changing the color of the contour region according to the scatter degree.

Processing Steps in Image Display System S

Figure 7:
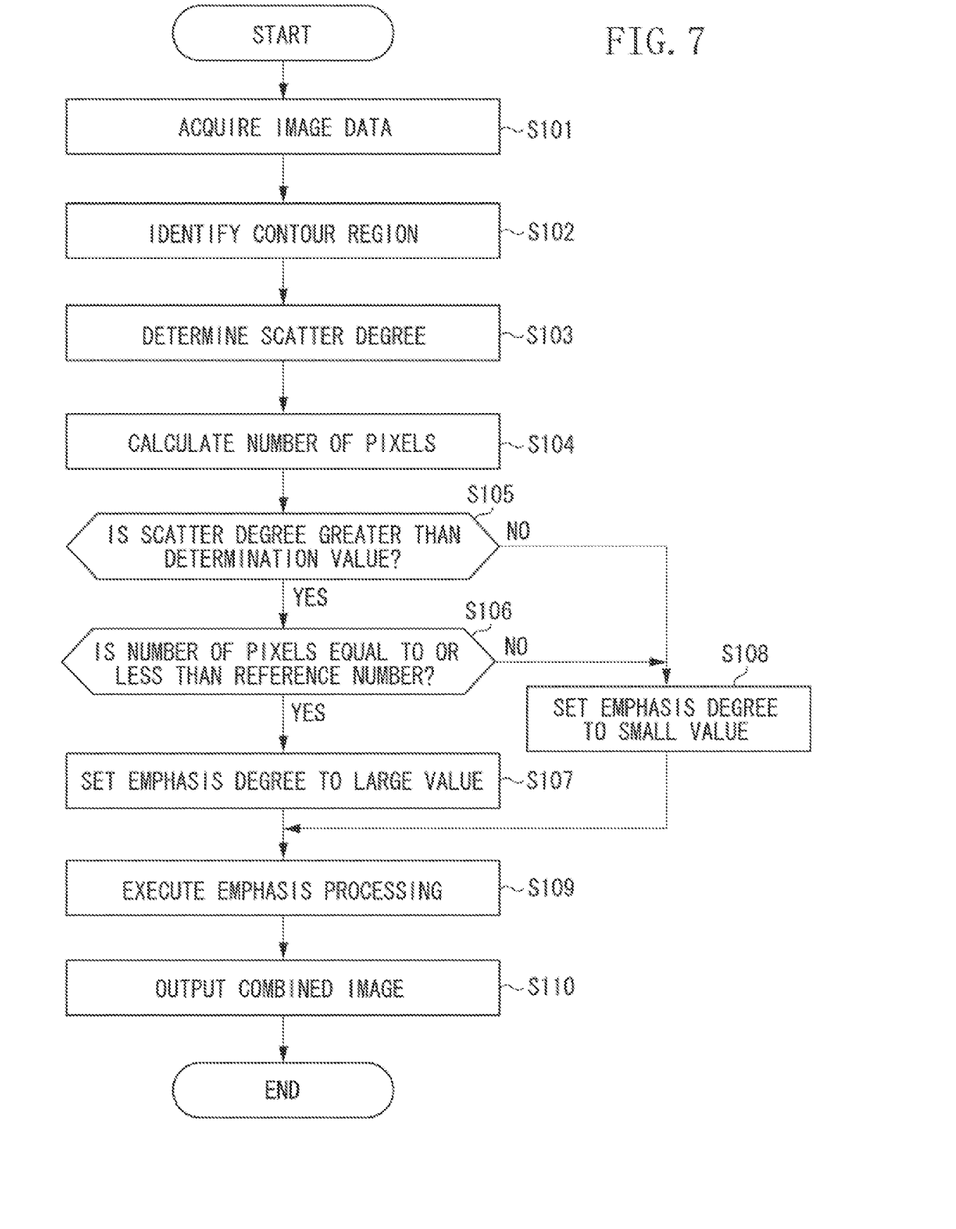
FIG. 7 is a flowchart illustrating processing steps from receiving an image signal of an input image to outputting a combined image.

Subsequently, description will be given to processing steps for outputting the combined image based on the image signal of the input image, executed by the image display system S. FIG. 7 is a flowchart illustrating processing steps from receiving the image signal to outputting the combined image.

First, in step S101, the acquisition unit 100 of the image processing apparatus 10 acquires the image data of the input image. Next, in step S102, the identification unit 301 identifies a contour region included in the image data. The identification unit 301 notifies the determination unit 302 of contour position information of the contour region, and notifies the specifying unit 303 of contour region information.

Next, in step S103, based on the contour position information notified from the identification unit 301, the determination unit 302 determines the scatter degree of the contour region in the input image. The determination unit 302 notifies the emphasis processing unit 304 of a determination result.

Next, in step S104, based on the contour region information notified from the identification unit 301, the specifying unit 303 calculates the number of pixels included in the contour region, and notifies the emphasis processing unit 304 of the number of pixels. In addition, the determination unit 302 may determine the scatter degree of the contour region after the specifying unit calculates the number of pixels. In other words, the processing in steps S103 and S104 can be executed in arbitrary order.

Next, if the scatter degree of the contour region is greater than the determination value L (YES in step S105), the processing proceeds to step S106. In step S106, the emphasis processing unit 304 determines whether the number of pixels in the contour region is equal to or less than the reference number X. If the number of pixels in the contour region is equal to or less than the reference number X (YES in step S106), the processing proceeds to step S107. In step S107, the emphasis processing unit 304 sets the emphasis degree to a large value.

On the other hand, if the scatter degree of the contour region is equal to or less than the determination value L (NO in step S105), or if the number of pixels is greater than the reference number X (NO in step S106), the processing proceeds to step S108. In step S108, the emphasis processing unit 304 sets the emphasis degree of the emphasis processing to a small value. In addition, the emphasis processing unit 304 may set the emphasis degree of the emphasis processing to a different value depending on the case where the scatter degree is greater than the determination value L or the case where the number of pixels is equal to or less than the reference number X. For example, in a case where the scatter degree is greater than the determination value L, the emphasis processing unit 304 may set the emphasis degree of the emphasis processing to a larger value in comparison to the case where the number of pixels is equal to or less than the reference number X.

Next, in step S109, the emphasis processing unit 304 executes the emphasis processing on the contour region using the set emphasis degree and generates a combined image. Subsequently, in step S110, the output unit 305 outputs the combined image to the display device 20.

Further, in the above-described exemplary embodiment, description has been given to a configuration including the processing step for calculating the number of pixels included in the contour region (i.e., step S104) and the processing step for determining whether the number of pixels in the contour region is equal to or less than the reference number X (i.e., step S106). However, the image processing apparatus 10 may execute the processing without taking the processing steps S104 and S106.

Effect of the First Exemplary Embodiment

As described above, the image processing apparatus 10 according to the present exemplary embodiment identifies the contour region in the input image and determines the scatter degree of the contour region. Then, in a case where the scatter degree of the contour region is greater than the determination value L, the image processing apparatus 10 executes the emphasis processing using the greater emphasis degree of the contour region in comparison to the case where the scatter degree is equal to or less than the determination value L, and outputs the combined image including the contour region on which the emphasis processing is executed to the display device 20. With this configuration, the contour regions scattered in the combined image can be emphasized, and thus the visibility of the contour regions scattered in the combined image is improved.

Hereinafter, a second exemplary embodiment will be described. In the image display system S according to the first exemplary embodiment, when the scatter degree of the contour region is greater than the determination value L, the emphasis processing unit 304 executes the emphasis processing by changing a pixel value of the pixel in the contour region or in a vicinity of the contour region. On the contrary, the image display system S according to the present exemplary embodiment is different in that the emphasis processing unit 304 adds an image around the contour region in a case where the number of pixels in the contour region calculated by the specifying unit 303 is equal to or less than a reference number Y (i.e., second predetermined number) that is less than the reference number X, and the scatter degree of the contour region is equal to or less than a determination value M (i.e., second predetermined value) that is less than the determination value L.

Figure 8A:
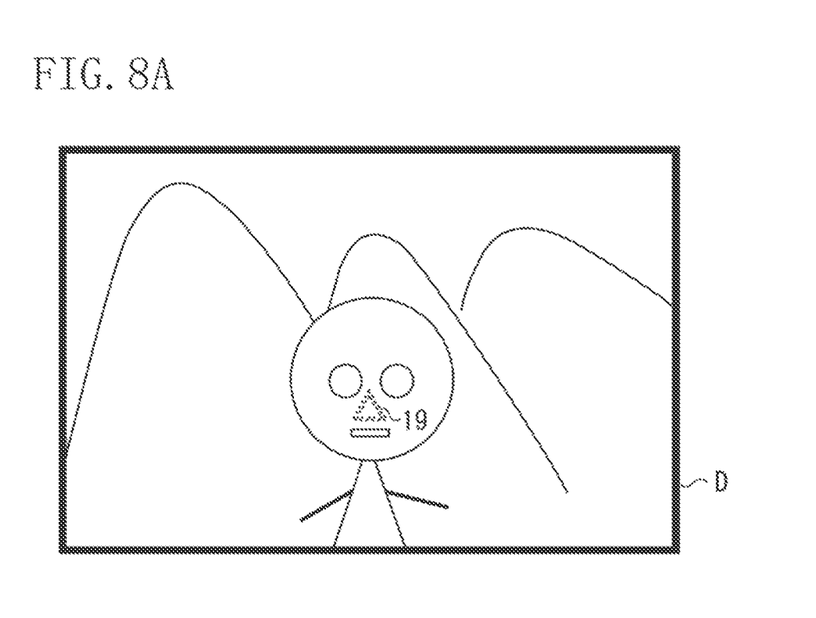
FIG. 8A is a diagram illustrating another example of a contour region in an input image.

FIG. 8A is a diagram illustrating another example of the contour region in the input image. In the example illustrated in FIG. 8A, a contour region 19 as a contour of a nose of a person as an object in an input image D is indicated by a dotted line. In the example illustrated in FIG. 8A, the pixels included in the contour region 19 are small and concentrated in a certain range in the image, so that visibility of the contour region 19 is deteriorated.

For example, when the emphasis processing is to be executed on the contour region 19 illustrated in the example in FIG. 8A, the emphasis processing unit 304 executes the emphasis processing for superimposing an image W onto a region including the contour region 19 in a case where the number of pixels included in the contour region 19 detected from the input image D is equal to or less than the reference number Y and the scatter degree of the contour region 19 is equal to or less than determination value M.

Figure 8B:
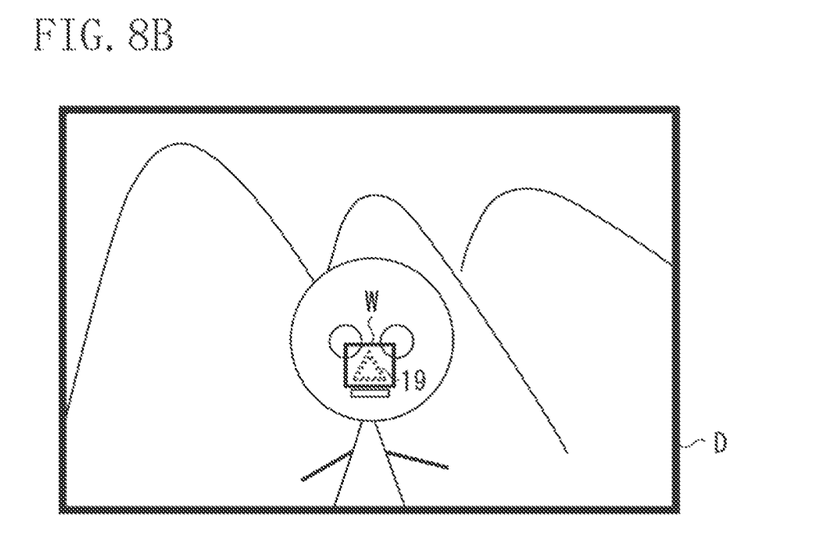
FIG. 8B is a diagram illustrating another example of a combined image in which emphasis processing is executed on a contour region.

FIG. 8B is a diagram illustrating an example of the combined image in which the emphasis processing is executed on the contour region. In the example illustrated in FIG. 8B, the image W is superimposed on the region including the contour region 19, and thus visibility of the contour region 19 is improved in comparison to the example illustrated in FIG. 8A. With this configuration, even if the contour region is less visible because the scatter degree of the contour region in the input image is low and an area occupied by the contour region is small, it is possible to efficiently improve the visibility of the contour region.

Further, in the present exemplary embodiment, the emphasis processing unit 304 adds a rectangular image as the image W used for identifying the contour region. However, the configuration is not limited thereto. For example, the image W used for identifying the contour region may be an image of an arrow that indicates the contour region. Further, the color of the image W may be different from the color of the contour region.

Effect of the Second Exemplary Embodiment

As described above, when the scatter degree of the contour region detected from the input, image is equal to or less than the determination value N, and the number of pixels included in the contour region is equal to or less than the reference number Y, the image processing apparatus 10 according to the second exemplary embodiment adds an image used for identifying the contour region. With this configuration, the region including the contour region in the image can be visualized, and thus it is possible to generate a combined image in which visibility of the contour region is improved efficiently.

For example, if the area occupied by the contour region in the input image is small and visibility thereof is low even though the processing for emphasizing the contour region itself is executed, the visibility of the contour region in the combined image can be improved by superimposing and displaying the image for identifying the contour region thereon.

While the present invention has been described with reference to the exemplary embodiments, a technical scope of the present invention is not limited to that described in the above exemplary embodiments, and many variations and modifications are possible within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (PAM), a read only memory (ROM), a storage of distributed computing systems, an optical disk (such as a compact disc (CD), digital versatile disc (DVD), or Blueray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-113959, filed Jun. 4, 2015, which is hereby incorporated by reference herein in its entirety.

What is claimed is:

1. An image processing apparatus comprising:
   at least one processor; and
   at least one memory storing a program which, when executed by the at least one processor, causes the image processing apparatus to:
   identify a plurality of contour regions, each respectively including a contour component, in an image;
   determine a scatter degree of the plurality of contour regions in the image;
   increase, in a case where the scatter degree of the plurality of contour regions is greater than a first predetermined value, an emphasis degree of the plurality of contour regions in comparison to a case where the scatter degree is equal to or less than the first predetermined value; and
   output, to a display unit, the image including the plurality of contour regions, in which the emphasis degree of the plurality of contour regions is the increased emphasis degree,
   wherein the scatter degree is a degree to which the contour regions are spatially scattered in the image.

2. The image processing apparatus according to claim 1, wherein a number of pixels included in the plurality of contour regions is specified, and
   wherein, in a case where the specified number of pixels is equal to or less than a first predetermined number and the scatter degree of the plurality of contour regions is greater than the first predetermined value, the emphasis degree of the plurality of contour regions is increased.

3. The image processing apparatus according to claim 2, wherein, in a case where the specified number of pixels is equal to or less than a second predetermined number that is less than the first predetermined number and the scatter degree of the plurality of contour regions is equal to or less than a second predetermined value that is less than the first predetermined value, an additional image used for identifying the plurality of contour regions is combined to the image.

4. The image processing apparatus according to claim 1, wherein, in a case where the scatter degree is greater than the first predetermined value, the emphasis degree of the plurality of contour regions is set to a magnitude according to a magnitude of the scatter degree.

5. The image processing apparatus according to claim 1, wherein the image is divided into a plurality of divided regions and a contour region in each of the divided regions is identified, and
wherein an emphasis degree of a contour region included in a divided region, in which the scatter degree is greater than the first predetermined value from among the plurality of divided regions, is increased.

6. The image processing apparatus according to claim 1, wherein each of the plurality of contour regions is identified by detecting a contour component in the image, and
wherein the emphasis degree of the plurality of contour regions is increased by changing a thickness of a contour line corresponding to the detected contour component in the image.

7. An image processing method using a processor to perform steps of:
identifying a plurality of contour regions, each respectively including a contour component, in an image;
determining a scatter degree of the plurality of contour regions in the image;
increasing, in a case where the scatter degree of the plurality of contour regions is greater than a first predetermined value, the emphasis degree of the plurality of contour regions in comparison to a case where the scatter degree is equal to or less than the first predetermined value; and
outputting, to a display unit, the image including the plurality of contour regions, in which the emphasis degree of the plurality of contour regions is the increased emphasis degree,
wherein the scatter degree is a degree to which the contour regions are spatially scattered in the image.

8. The image processing method according to claim 7, wherein the processor further performs a step of specifying a number of pixels included in the plurality of contour regions, and
wherein, in a case where the specified number of pixels is equal to or less than a first predetermined number and the scatter degree of the plurality of contour regions is greater than the first predetermined value, the emphasis degree of the plurality of contour regions is increased.

9. The image processing method according to claim 8, wherein, in a case where the specified number of pixels is equal to or less than a second predetermined number that is less than the first predetermined number and the scatter degree of the plurality of contour regions is equal to or less than a second predetermined value that is less than the first predetermined value, an additional image used for identifying the plurality of contour regions is combined to the image when the emphasis degree of the plurality of contour regions is increased.

10. The image processing method according to claim 7, wherein, in a case where the scatter degree is greater than the first predetermined value, the emphasis degree of the plurality of contour regions is set to a magnitude according to a magnitude of the scatter degree when the emphasis degree of the plurality of contour regions is increased.

11. The image processing method according to claim 7,
wherein, when the plurality of contour regions is identified, the image is divided into a plurality of divided regions, and a contour region in each of the divided regions is identified, and
wherein, when the emphasis degree is increased, an emphasis degree of a contour region included in a divided region, in which the scatter degree is greater than the first predetermined value, from among the plurality of divided regions, is increased.

12. The image processing method according to claim 7,
wherein, when the plurality of contour regions is identified, each of the plurality of contour regions is identified by detecting a contour component in the image, and
wherein, when the emphasis degree is increased, the emphasis degree of the plurality of contour regions is increased by changing a thickness of a contour line corresponding to the detected contour component in the image.

13. A non-transitory computer-readable storage medium storing a program for causing a computer to execute an image processing method comprising:
identifying a plurality of contour regions, each respectively including a contour component, in an image;
determining a scatter degree of the plurality of contour regions in the image;
increasing, in a case where the scatter degree of the plurality of contour regions is greater than a first predetermined value, an emphasis degree of the plurality of contour regions in comparison to a case where the scatter degree is equal to or less than a first predetermined value; and
outputting, to a display unit, the image including the plurality of contour regions, in which the emphasis degree of the plurality of contour regions is the increased emphasis degree,
wherein the scatter degree is a degree to which the contour regions are spatially scattered in the image.

14. The image processing apparatus according to claim 1, wherein the scatter degree is determined based on spatial distances between the plurality of contour regions in the image.

15. The image processing apparatus according to claim 14, wherein the scatter degree is determined based on an average value of spatial distances between the plurality of contour regions in the image.

16. The image processing method according to claim 7, wherein the scatter degree is determined based on spatial distances between the plurality of contour regions in the image.

17. The image processing method according to claim 16, wherein the scatter degree is determined based on an average value of spatial distances between the plurality of contour regions in the image.

* * * * *